UNITED STATES PATENT OFFICE 2,471,488

CYANINE DYESTUFFS

John David Kendall and Frank Peter Doyle, Ilford, England, assignors to Ilford Limited, Ilford, England, a British company No Drawing. Application January 21, 1948, Serial No. 3,561. In Great Britain January 24, 1947

7 Claims. (Cl. 260—240)

This invention relates to the production of symmetrical cyanine dyestuffs.

According to the present invention symmetrical cyanine dyestuffs are prepared by condensing one molecular equivalent of cyanacetic acid with at least two molecular equivalents of an alkyl or aralkyl quaternary salt of a five-membered or six-membered heterocyclic nitrogen compound having in $\alpha$ or $\gamma$ position to the quaternary nitrogen atom a thioether or selenoether group (including an aryl, alkyl, or aralkyl thioether or selenoether group) separated from the heterocyclic nucleus by a vinyl or butadienyl group), or a —(CH=CH)$_m$ NH$_2$ group where $m$ is 1, 2 or 3 (including N-acyl, N-aryl and N-acylaryl substituted groups of this type).

For the sake of convenience the expression "thioether vinyl and selenoether vinyl types of group" will be understood to mean the various classes of such groups referred to above, and the expression "amino vinyl type of group" will be understood to mean the various groups of the formula —(CH=CH)$_m$ NH$_2$ and substitution derivatives referred to above.

The reaction is preferably effected in the presence of a basic condensing agent, e. g. pyridine, triethylamine or sodium acetate in ethyl alcohol.

The course of the reaction may be typified by the following example:

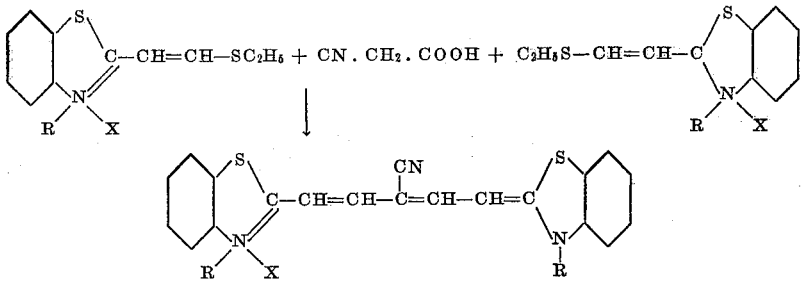

The products thus conform to the general formula:

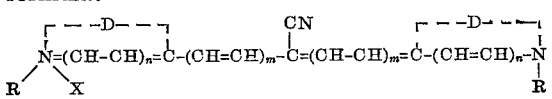

where D is the residue of a five-membered or six-membered heterocyclic nitrogen nucleus, R is an alkyl or aralkyl group and X is an acid radicle, $n$ is nought or one and $m$ is 1, 2 or 3.

The ring system D of the heterocyclic nitrogen compound may be, for example, selected from thiazoles, oxazoles, selenazoles and their polycyclic homologues such as those of the benzene, naphthalene, acenaphthene and anthracene series, pyridine and its polycyclic homologues such as quinoline and $\alpha$- and $\beta$-naphthoquinolines, lepidines, indolenines, diazines (e. g. thio$\beta\beta'$-diazole), oxazolines, thiazolines and selenazolines. The polycyclic compounds of these series may also be substituted in the carbocyclic rings with one or more groups such as alkyl, aryl, amino, hydroxy, alkoxy methylene-dioxy groups or by halogen atoms.

The acid radicle X may be, for example, halide, sulphate or p-toluene sulphonate.

Where R is an alkyl group it may be a lower alkyl group, e. g. methyl, ethyl or propyl, which is generally preferable, or it may be a higher alkyl group. Where R is an aralkyl group it may be benzyl or naphthylmethyl.

The following examples, in which the parts are by weight, will serve to illustrate the invention:

EXAMPLE 1

Bis - 2[3 - methyl benzthiazole]$\gamma$-cyano - pentamethine-cyanine p-toluene sulphate 20 parts of 2($\omega$-ethylthiovinyl)benzthiazole-metho-p-toluene sulphonate, 2.1 parts of cyanacetic acid and 200 parts of pyridine were heated for 30 minutes on the waterbath, and after cooling and dilution with ethyl alcohol the thick suspension was filtered and the dyestuff washed with ethyl alcohol, benzene and water. Recrystallisation from methyl alcohol gave blue needles, M. Pt. 262° C. (with decomposition). The corresponding iodide melted at 265° C. (with decomposition).

EXAMPLE 2

Bis-2[3-ethyl benzthiazole] - $\gamma$ - cyano-pentamethine-cyanine-iodide 90 parts of 2($\omega$-acetanilido vinyl)benzthiazole ethiodide, 8.5 parts of cyanacetic acid and 400 parts of pyridine were refluxed for 1 hour and the precipitated dyestuff separated by filtration and washed. Recrystallisation from methyl alcohol gave tiny green crystals, M. Pt. 282° C. (with decomposition).

EXAMPLE 3

*Bis-2-[1.2.3.trimethyl indolenine]-γ-cyano-pentamethine-cyanine-iodide*

42 parts of 2(ω-ethylthio vinyl)-3.3-dimethyl indolenine metho-p-toluene sulphonate, 4.3 parts of cyanacetic acid and 250 parts of pyridine were refluxed for 30 minutes and the crimson solution poured into aqueous potassium iodide solution. Cooling and dilution gave a tarry material which, when boiled out with benzene, yielded green crystals of the desired dyestuff. Purification was effected by dissolving the crystals in the minimum of methyl alcohol, filtering and diluting the filtrate with ether, to give glittering blue-green crystals, M. Pt. 256° C. (decomp.).

EXAMPLE 4

*Bis-2-[1-ethyl quinoline]-γ-cyano-pentamethine-cyanine-iodide*

2(ω-ethylthio-vinyl)-quinoline etho-p-toluene sulphonate (the crude yield obtained by the method described in B. P. 555,935 from 69 parts quinaldine etho-p-toluene sulphonate, and 40 parts triethyl trithio-ortho-formate in 500 parts acetic anhydride) was refluxed with 8.5 parts cyanacetic acid in 300 parts of pyridine for 30 minutes and the blue solution poured into aqueous potassium iodide solution. The dyestuff which crystallised out was filtered, washed and recrystallised from methyl alcohol to give glittering green matted needles, M. Pt. 276° C. (decomp.).

The products obtained sensitise silver halide photographic emulsions.

What we claim is:

1. Process for the production of symmetrical cyanine dye-stuffs which comprises condensing one molecular equivalent of cyanacetic acid with at least two molecular equivalents of a compound selected from the class consisting of alkyl and aralkyl quaternary salts of 5-membered and 6-membered heterocyclic nitrogen compounds having in one of the α and γ positions to the quaternary nitrogen atom groups selected from thio ether-vinyl, selenoether-vinyl and amino-vinyl groups.

2. A process according to claim 1 wherein the reaction is effected in the presence of a basic condensing agent.

3. A dyestuff of the general formula:

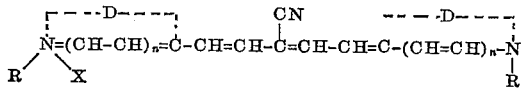

wherein D is a residue selected from the class consisting of 5-membered and 6-membered heterocyclic nitrogen nuclei, R is a group selected from the class consisting of alkyl and aralkyl groups, X is an acid radical and $n$ is selected from the class consisting of 0 and 1.

4. A dyestuff of the general formula:

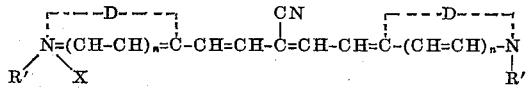

wherein D is a residue selected from the class consisting of 5-membered and 6-membered heterocyclic nitrogen nuclei, R' is a lower alkyl groups, X is an acid radical and $n$ is selected from the class consisting of 0 and 1.

5. A compound of the formula:

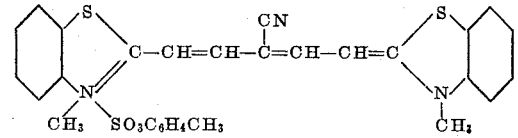

6. A compound of the formula:

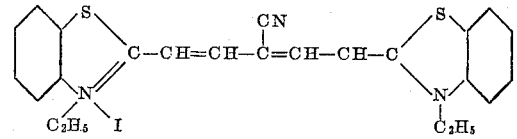

7. A compound of the formula:

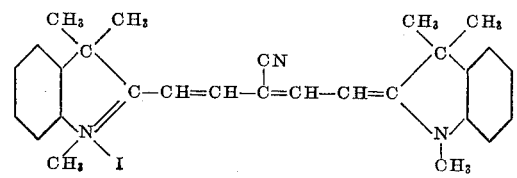

JOHN DAVID KENDALL.
FRANK PETER DOYLE.

REFERENCES CITED

The following references are of record in the file of this patent:

UNITED STATES PATENTS

| Number | Name | Date |
|---|---|---|
| 2,153,169 | Brooker | Apr. 4, 1939 |
| 2,345,094 | Brooker | Mar. 26, 1944 |

FOREIGN PATENTS

| Number | Country | Date |
|---|---|---|
| 431,141 | Great Britain | June 24, 1935 |